United States Patent [19]
Patte et al.

[11] Patent Number: 4,985,056
[45] Date of Patent: Jan. 15, 1991

[54] DEVICE FOR PURIFYING CONTAMINATED GAS

[75] Inventors: Philippe Patte, Nancy; Andre Cordier, Clamart, both of France

[73] Assignee: Air Industrie Systemes, Courbevoie, France

[21] Appl. No.: 447,462

[22] Filed: Dec. 7, 1989

[30] Foreign Application Priority Data

Dec. 9, 1988 [FR] France ................... 88 16425

[51] Int. Cl.$^5$ ............................................. B01D 47/00
[52] U.S. Cl. .................................. 55/240; 261/112.1; 118/326; 98/115.2
[58] Field of Search ................. 55/240; 261/112.1; 118/326; 98/115.2

[56] References Cited

U.S. PATENT DOCUMENTS 4,299,602 11/1981 Cordier et al. ............... 261/112.1

Primary Examiner—Bernard Nozick
Attorney, Agent, or Firm—Sughrue, Mion, Zinn, Macpeak and Seas

[57] ABSTRACT

A device for purifying contaminated gas, such as air drawn from an automobile painting tunnel and containing a mist of paint particles, includes an upper water feed orifice 1 connected to a lower flow channel 4 by an intermediate channel 3 which diverges progressively from top to bottom. A horizontal, transverse wall 8 is positioned beneath the feed orifice at a downstream section of the intermediate channel. Water falling against the wall splashes out in a curtain of droplets through which the air must pass, with the paint particles thus being entrained in the droplets and removed from the air flow. The low divergence angles of the intermediate channel ensures the continuous wetting of its walls to prevent clogging.

5 Claims, 4 Drawing Sheets

DEVICE FOR PURIFYING CONTAMINATED GAS

BACKGROUND OF THE INVENTION

This invention concerns a device for purifying contaminated gas by passing it through a layer of cleansing liquid. More precisely, the invention relates to a device for purifying gas containing solid and/or liquid particles such as paint particles in the air drawn from painting enclosures or tunnels, such as those used for painting automobile bodies.

U.S. Pat. No. 4,299,602 teaches a gas-purifying device in which a cleansing liquid such as water passes through the device from top to bottom, mixes with the contaminated gas, entrains the particles suspended therein, and is collected in a receiving tank. After the cleansing liquid and the contaminated gas are fed through an upper orifice, they enter a connecting channel which diverges progressively as it extends downwardly, and which connects the cleansing liquid feed orifice to an approximately vertical flow wall(s), a horizontal transverse wall being positioned beneath the feed orifice at the level of the flow wall. The cleansing liquid flows along the flow wall after falling on the horizontal transverse wall, forming a sheet of droplets after impact against said wall, all of which collect in the liquid layer which flows along the flow wall after the particles in suspension are immobilized in the circulating gas. This device allows the collection of all particles in suspension in the contaminated gas requiring treatment.

Nevertheless, until now no device has been able to provide for the continuous flow of the cleansing liquid through the connecting channel joining the cleansing liquid feed orifice to the flow wall. As a result dry areas form on the surface of the connecting channel, and since the liquid does not flow in these areas, the particles in suspension in the contaminated gas adhere to them, thus gradually clogging the device.

Furthermore, such clogging raises an important, heretofore unresolved problem relating to the manufacture of these devices. A major consideration in a contaminated gas cleaner such as the one described in U.S. Pat. No. 4,299,602 is the loss of head caused by the horizontal transverse wall, also called a shield. As stated above, the purification of the gas is effected by droplets formed when the cleansing liquid falls on the shield, these droplets then rebounding toward the flow wall where they are collected after they have entrapped the particles suspended in the contaminated gas.

Accordingly, the shield cannot be positioned at the level of the connecting channel since, as stated above, this channel contains dry areas in which the particle-laden droplets would be smashed, thus clogging the connecting channel.

The sole possibility for remedying the loss of head in a device of this kind would thus consist in the enlargement of the shield by reducing the space between the shield and the flow wall. The only suitable industrial solution has, therefore, always been to halt assembly to dismantle the old shield and to install a new one. This process is, of course, costly and time-consuming.

Furthermore, as evidenced by measurements taken above the liquid feed orifice, a purification device such as that described above functions too noisily. More specifically, and in addition to the excessive general noise level of such a device, the sound spectrum exhibits a peak in the low-frequency range, at about 300 Hz. While high-pitched sounds can be absorbed fairly readily by insulating materials, the much greater difficulty posed by the absorption of low-pitched sounds is well known.

SUMMARY OF THE INVENTION

Therefore, an object of this invention is to provide a contaminated gas purification device of the type described above, but which in addition establishes a continuous flow of the cleansing liquid through the connecting channel, while also allowing a reduction of the sound level, especially low-pitched noise.

DETAILED DESCRIPTION OF THE PREFERRED EMBODIMENTS

Figure 1:
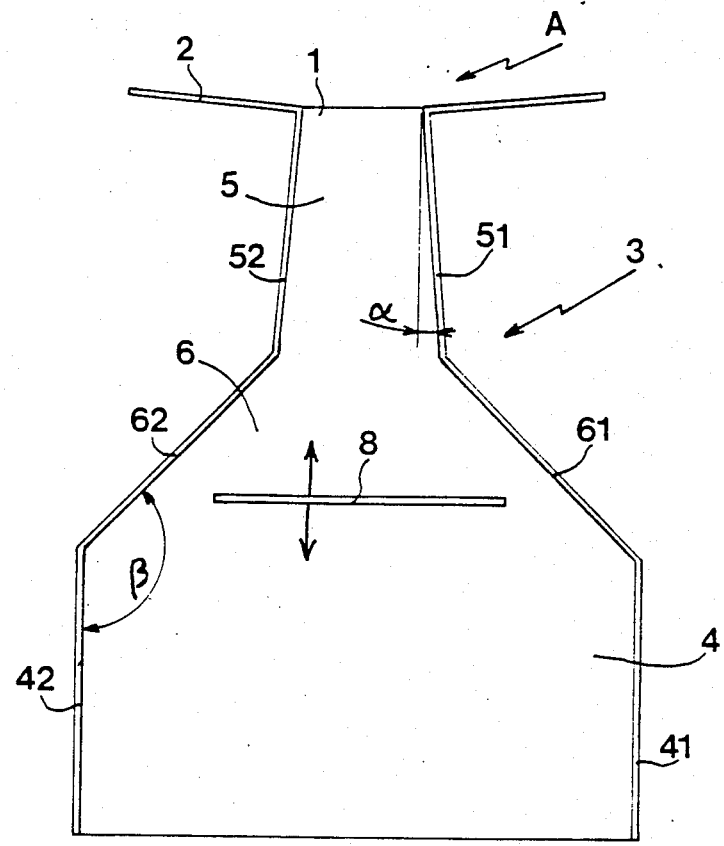
FIG. 1 is a general cross-sectional diagram of a purification device according to the invention.

In FIG. 1, a cleansing liquid feed device A opens in a lower surface by means of an orifice 1, typically an elongate slot. The device A may, as shown in FIG. 1, be a sloping flow or drainage wall 2 mounted below the floor grate of a painting tunnel, extending over the full length thereof, and fed by discharged droplets (not shown); it might also be a simple overflow device, the overflow device being in this case the orifice 1. In any case, the orifice 1 empties downwardly into a connecting channel 3 which diverges progressively in form from top to bottom. A flow channel 4 having upright walls 41 and 42 is connected to the connecting channel 3 to form a downward extension thereof. The walls 41 and 42 of the flow channel 4 form an angle of approximately 5° with the vertical.

As shown in FIG. 1, the connecting channel 3 has an upstream section 5 and a downstream section 6, the upstream section 5 being connected to the cleansing liquid (water) feed orifice 1 and the downstream section 6 connected to the flow channel 4. The upstream section 5 is composed of two flat surfaces 51 and 52 forming a dihedral converging upwardly at a half-angle α of between 0 and 10°; the two surfaces 51 and 52 may be parallel. The downstream section 6 is composed of two flat surfaces 61 and 62 forming a dihedral which converges upwardly, surface 61 being connected to the surface 41 of the flow channel 4, and the surface 62 being connected to the surface 42 of the flow channel.

A suction fan or the like, not shown, would be disposed below the flow channel outlet and preferably off to one side to draw the contaminated air and entrained paint mist down through the device, and through the sheets or curtains of water droplets splashing out laterally from the transverse wall or shield 8.

According to one advantageous feature of the invention, the angle β between the respective surfaces 61, 62 of the connecting channel 3 and the surfaces 41, 42 of the flow channel 4 ranges between 125 and 145°. The trickle of liquid that flows along the downstream section 6 must not be diverted away from this downstream section, and furthermore, no vortex must be created at the junction between the downstream section 6 and the flow channel 4. These two operating requirements are met if the angle $\beta$ between the surfaces 61, 62 respectively and surfaces 41, 42 ranges between the two limiting values specified above.

According to the embodiment in FIG. 1, the upstream section 5 is directly connected to the downstream section 6 without the insertion of a median part, the angle $\alpha$ being shown at about 5°.

Figure 2:
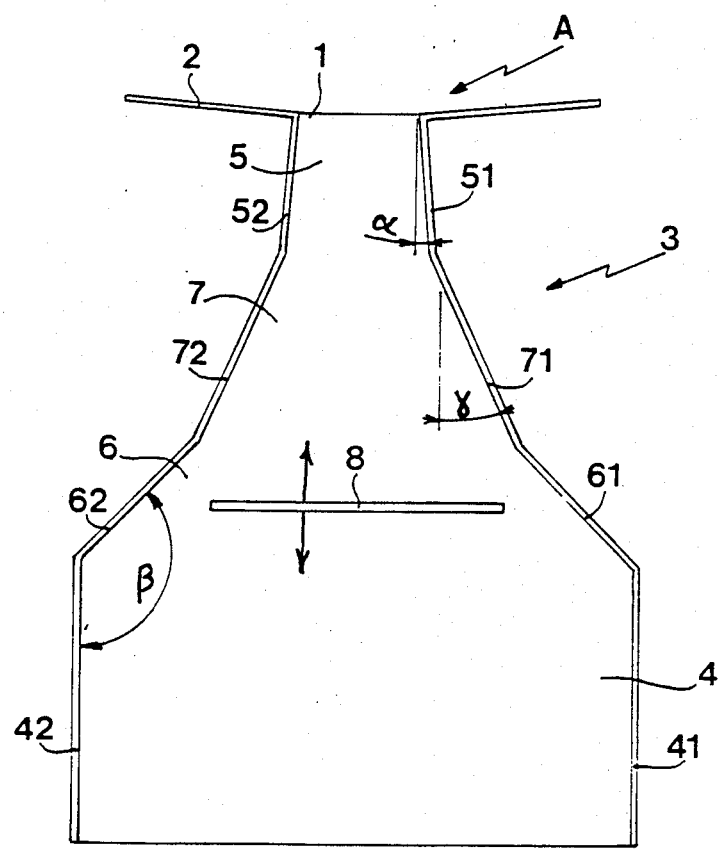
FIG. 2 is a variant of the device according to the invention.

According to another embodiment of the invention illustrated in FIG. 2. a median part 7 comprising a dihedral formed by two flat surfaces 71 and 72 may be interposed between the upstream and the downstream sections 5 and 6. In this case too, the connecting channel always diverges downwardly, increasing in degree as it extends from top to bottom, and the half-angle $\gamma$ of the two flat surfaces 71 and 72 ranges between the angles $\alpha$ and $180° - \beta$.

As shown in FIGS. 1 and 2, the transverse wall perpendicular to the flow channel 4 is positioned beneath the orifice 1 and at the level of the downstream section 6 of the connecting channel 3. This transverse wall is mounted so as to be vertically adjustable as shown by the arrow, using a mechanism which is not represented. Thus, the loss of head generated by the transverse wall may be changed by raising or lowering it, which draws closer together or separates the edges of the transverse wall and the downstream section 6 of the connecting channel 3, the distance between the downstream section 6 and the wall 8 being always less than the distance between said wall 8 and the flow channel 4.

Figure 3:
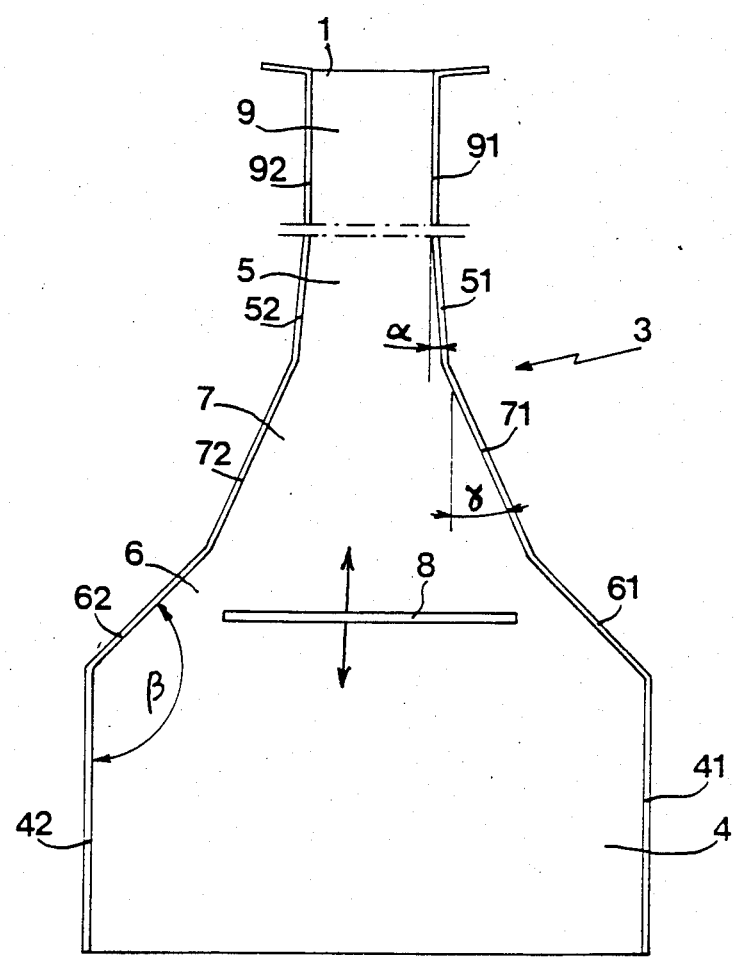
FIG. 3 shows another variant of the purification device of the invention.

According to a further variant of the invention illustrated in FIG. 3, the upstream section 5, whose half-angle $\alpha$ is 5°, is connected to the cleansing liquid feed orifice 1 by a shaft 9 made up of two flat parallel vertical surfaces 91 and 92. In fact, it has been found that the combination of the shaft 9 the connecting channel 3, and the flow channel 4 unexpectedly and substantially reduces the operating noise level when the following proportions are observed:

If H1 is the height of the shaft 9, H2 is the height of the upstream section 5, and D is the width of the orifice 1; then (H1 + H2) must fall between 3D and 5D, with H1 lying between 0.8H2 and 1.2H2.

Figure 4:
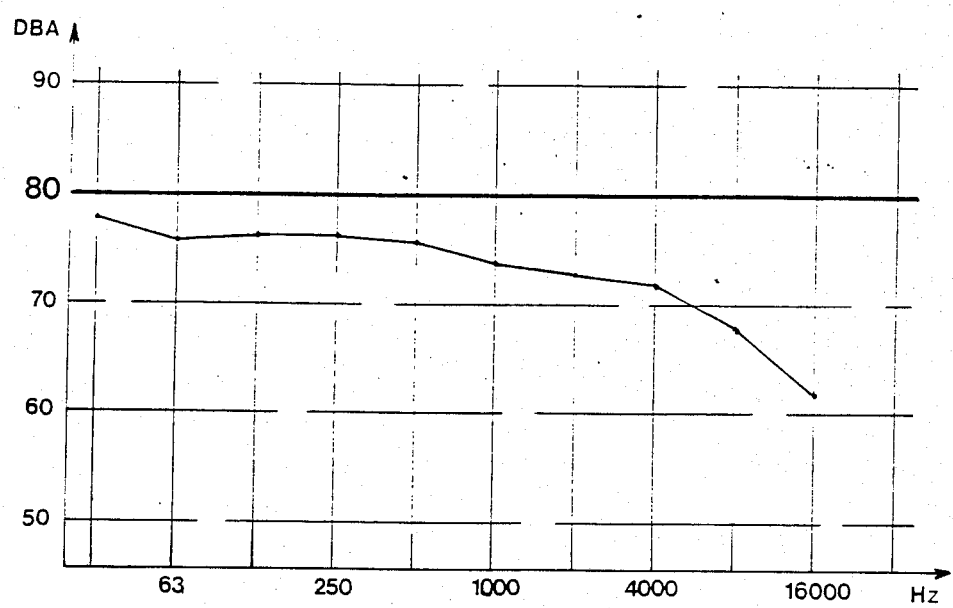
FIG. 4 illustrates the sound spectrum of the purification device according to the invention during operation.
Figure 5:
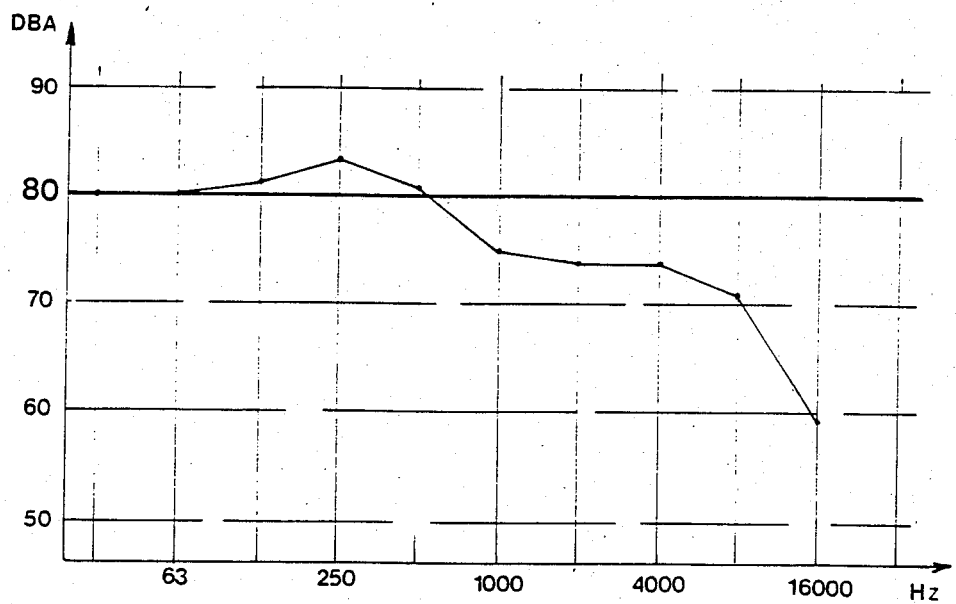
FIG. 5 illustrates the sound range of a previous purification device during operation.

As the comparison of the sound spectra in FIGS. 4 and 5 shows, when the operating conditions are identical, the device according to the invention allows a reduction of the average sound level from 83 DBA to below 80 DBA; this gain is particularly evident at low frequencies, which are normally the most difficult to attenuate.

While preserving the total effectiveness of the air cleansing device of U.S. Pat. No. 4,299,602, the present invention thus makes it possible to eliminate the adherence of paint to the surface of the connecting channel between the flow wall and the cleansing liquid feed orifice, while furthermore markedly reducing the sound level and permitting the use of a simple device to modify as desired the loss of head in the equipment.

We claim:

1. An apparatus for purifying a contaminated gas, particularly for removing paint mist particles from air, comprising, in descending vertical order:
   (a) mouth means (2) defining an upper inlet opening (1) for water and contaminated gas,
   (b) a downwardly extending, progressively outwardly divergent connecting channel (3) having an upper end coupled to the mouth means at an edge of the inlet opening, and
   (c) a downwardly extending lower flow channel (4) having an upper end coupled to a lower end of the connecting channel and a lower end defining an outlet for contaminated water and purified gas, wherein
   (d) the connecting channel includes an upstream section (5) having opposing, facing walls (51, 52) converging upwardly at a half-angle $\alpha$ to the vertical between 0° and 10°, and a downstream section (6) having opposite walls (61, 62) individually coupled at lower edges thereof to upper edges of opposite walls (41, 42) defining the lower flow channel at an angle $\beta$ between 125° and 145°, and
   (e) the opposite walls defining the lower flow channel diverge outwardly in a downward direction at an angle of approximately 5° to the vertical, and further comprising
   (f) a horizontal water splash shield (8) disposed transversely across the connecting channel at the level of the downstream section thereof.

2. An apparatus according to claim 1, wherein the level of the splash shield is vertically adjustable.

3. An apparatus according to claim 2, wherein the half-angle $\alpha$ of the walls (51, 52) of the upstream section (5) is 5°.

4. An apparatus according to claim 3, wherein the upstream section of the connecting channel is connected to the mouth means by a vertical shaft (9).

5. An apparatus according to claim 4, wherein, when H1 is the height of the vertical shaft (9), H2 is the height of the upstream section (5), and D is the width of the upper inlet opening (1), (H1+H2) lies between 3D and 5D, and H1 lies between 0.8H2 and 1.2H2.

* * * * *